US012143769B2

(12) United States Patent
Mohammadi et al.

(10) Patent No.: US 12,143,769 B2
(45) Date of Patent: Nov. 12, 2024

(54) LOUDSPEAKER FOR HEARING DEVICE

(71) Applicant: KNOWLES ELECTRONICS, LLC, Itasca, IL (US)

(72) Inventors: Mohammad Mohammadi, Rolling Meadows, IL (US); Charles King, Oak Park, IL (US); Yahui Zhang, Schaumburg, IL (US); Donald Verghese Jacob, Chicago, IL (US); Christopher Monti, Elgin, IL (US)

(73) Assignee: KNOWLES ELECTRONICS, LLC, Itasca, IL (US)

(*) Notice: Subject to any disclaimer, the term of this patent is extended or adjusted under 35 U.S.C. 154(b) by 231 days.

(21) Appl. No.: 18/058,095

(22) Filed: Nov. 22, 2022

(65) Prior Publication Data

US 2024/0171916 A1 May 23, 2024

(51) Int. Cl.

| | |
|---|---|
| ***H04R 11/02*** | (2006.01) |
| ***H04R 7/18*** | (2006.01) |
| ***H04R 31/00*** | (2006.01) |

(52) U.S. Cl.

CPC ............... *H04R 11/02* (2013.01); *H04R 7/18* (2013.01); *H04R 31/006* (2013.01); *H04R 2400/07* (2013.01)

(58) Field of Classification Search

CPC ............ H04R 9/025; H04R 1/10; H04R 7/20; H04R 9/047; H04R 9/06; H04R 9/02; H04R 7/04; H04R 2307/021; H04R 2307/025; H04R 2400/11; H04R 9/063; H04R 9/045;

(Continued)

(56) References Cited

U.S. PATENT DOCUMENTS

| | | | | |
|---|---|---|---|---|
| 8,223,996 B2 * | 7/2012 | Beekman | ............... | H04R 11/02 381/152 |
| 2008/0226115 A1 * | 9/2008 | Beekman | ............... | H04R 11/02 381/417 |

(Continued)

OTHER PUBLICATIONS

U.S. Appl. No. 17/404,902, to Mohammad Mohammadi et al., entitled, "Dual-Diaphragm Moving-Coil Audio Transducer for Hearing Device", assigned to Knowles Electronics, LLC, 23 pages, filed Aug. 17, 2021.

(Continued)

*Primary Examiner* — Carolyn R Edwards
*Assistant Examiner* — Julie X Dang

(57) ABSTRACT

A wearable loudspeaker includes a magnetic-flux-carrying housing that houses an acoustic sealing structure that separates an interior of the housing into a back volume and a front volume acoustically coupled to a sound port. A first coil is retained in the front volume and comprises a first winding about a corresponding first magnetic core. A second coil is retained in the back volume and comprises a second winding about a corresponding second magnetic core. Opposing surfaces of the first and second magnetic cores have opposite magnetic polarities and produce a magnetic field in a gap between the first and second coils. A magnetic-flux-carrying armature is movably located in the gap and fastened to the acoustic sealing structure. Sound is emitted from the sound port when the armature moves the acoustic sealing structure in the gap.

20 Claims, 14 Drawing Sheets

(58) Field of Classification Search
CPC ............ H04R 7/127; H04R 7/16; H04R 1/24; H04R 2209/041; H04R 9/043
See application file for complete search history.

(56) References Cited

U.S. PATENT DOCUMENTS

| | | | | |
|---|---|---|---|---|
| 2016/0183004 A1* | 6/2016 | Jiles | H04R 11/02 381/418 |
| 2019/0320272 A1* | 10/2019 | Jones | H04R 25/604 |

OTHER PUBLICATIONS

U.S. Appl. No. 17/813,923, to Charles Bender King et al., entitled, “Loudspeaker For Hearing Device”, assigned to Knowles Electronics, LLC, 22 pages, filed Jul. 20, 2022.

* cited by examiner

LOUDSPEAKER FOR HEARING DEVICE

FIELD OF THE DISCLOSURE

The present disclosure relates generally to loudspeakers suitable for use in body-worn hearing devices and other applications.

BACKGROUND

Sound-producing balanced armature receivers are commonly used in wired and wireless earphones, True Wireless Stereo (TWS) devices and in hearing aids, among other prescription and non-prescription devices. Such receivers generally comprise a diaphragm (also referred to herein as a "reed") disposed in a housing and separating an interior thereof into a back volume and a front volume coupled to a sound port. A motor disposed in the back volume comprises an armature having a first portion connected to a yoke and a second portion movably disposed between magnets retained in spaced-apart relation by the yoke. The movable portion of the armature is also connected to a movable part of the diaphragm. An electrical audio signal applied to a coil disposed about the armature causes the armature to vibrate between the magnets and actuate the diaphragm, which emits sound from the sound port via the front volume.

Balanced armature receivers are often combined with dynamic speakers to extend the limited bandwidth of dynamic speakers to higher frequencies. Balanced armature receivers are also comparatively smaller and more efficient than dynamic speakers. However balanced armature receivers are generally more costly than dynamic speakers due in part to the complexity and laborious assembly requirements of balanced armature receivers. Thus there is an ongoing need for improvements in loudspeakers suitable and sized for use in both prescription and non-prescription hearing and other body-worn devices.

BRIEF DESCRIPTION OF THE DRAWINGS

The objects, features and advantages of the present disclosure will become more fully apparent from the following detailed description of representative embodiments and the appended claims considered in conjunction with the accompanying drawings described below.

Those of ordinary skill in the art will appreciate that the figures are illustrated for simplicity and clarity and therefore may not be drawn to scale and may not include well-known features, that the order of occurrence of actions or steps may be different than the order described or that the actions or steps may be performed concurrently unless specified otherwise, and that the terms and expressions used herein have the meanings understood by those of ordinary skill in the art except where different meanings are attributed to them herein.

DETAILED DESCRIPTION

The disclosure relates generally to loudspeakers suitable for use in hearing devices worn in or partially in a user ear canal or in or on the user's ear, among other body-worn hearing devices. Such hearing devices include prescription hearing aids including but not limited to In-the-Ear (ITE) devices, wired and wireless earphones, ear buds, and in-ear monitors, among other in-ear and on-the-ear hearing devices. The loudspeakers disclosed herein can also be used in other body-worn devices, like over-the-ear headphones. Loudspeakers suitable for use in these and other hearing devices are also referred to herein as "wearable loudspeakers".

According to one aspect of the disclosure, a wearable loudspeaker comprises a magnetic-flux-carrying housing. In some examples, the housing comprises a first housing portion and a second housing portion. An acoustic sealing structure separates an interior of the housing into a front volume and a back volume, the front volume is acoustically coupled to a sound port of the housing. A first coil is retained by the first housing portion in the front volume, the first coil comprising a first winding about a corresponding first magnetic core. A second coil is retained by the second housing portion in the back volume, the second coil comprising a second winding about a corresponding second magnetic core. Opposing surfaces of the first and second magnetic cores have opposite magnetic polarities and produce a magnetic field in a gap between the first and second magnets. A magnetic-flux-carrying armature is movably located in the gap and fastened to the acoustic sealing structure, wherein sound is emitted from the sound port when the armature moves the acoustic sealing structure in the gap.

In some embodiments the first and second coils are configured to produce counter-rotating currents in the first and second windings in response to a common excitation signal applied to the first and second coils. Sound is emitted from the sound port when the armature moves the acoustic sealing structure in response to the common excitation signal. In certain embodiments, the magnetic-flux-carrying armature includes multiple armature elements that move in the gap in response to the common excitation signal.

Figure 1:
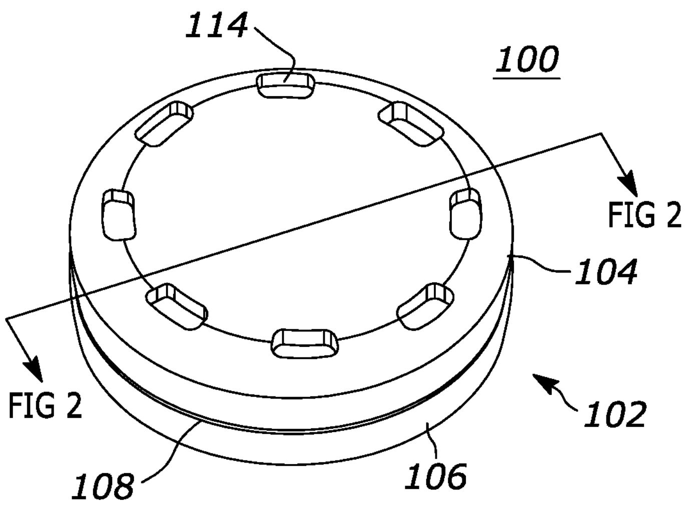
FIG. 1 is a perspective view of a loudspeaker in accordance with a representative example disclosed herein.
Figure 2:
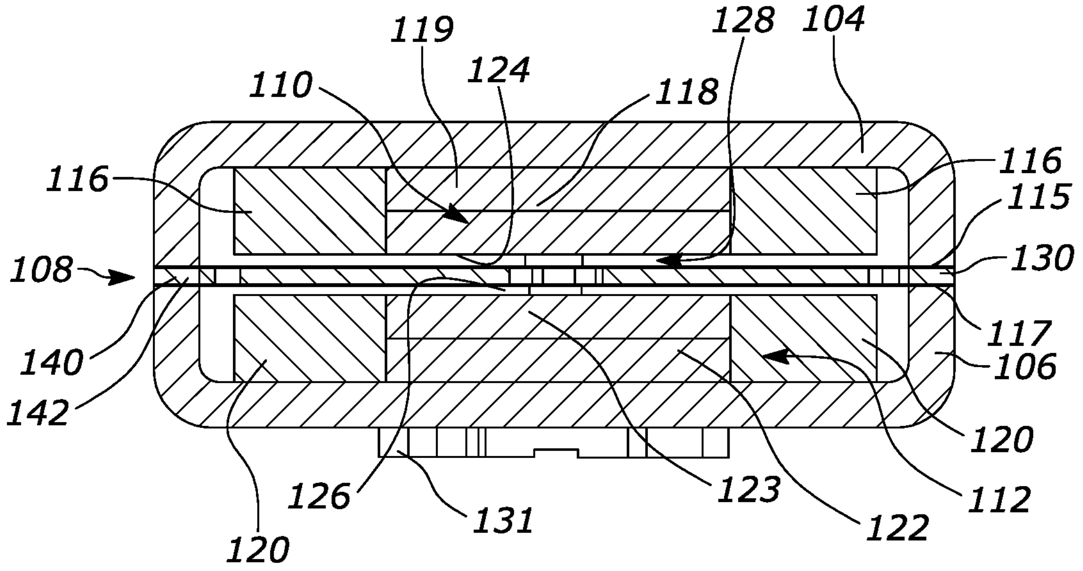
FIG. 2 is a cross-sectional view of the loudspeaker shown in FIG. 1.

In FIGS. 1 and 2, an example hearing-device loudspeaker includes a magnetic-flux-carrying housing 102 comprising a first housing portion 104 and a second housing portion 106. The first and second housing portions 104, 106 are magnetic-flux carrying components. An acoustic sealing structure 108, such as a urethane, Mylar, silicone or other layer or film, separates an interior of the housing into a front volume 110 and a back volume 112. The front volume is acoustically coupled to one or more sound ports 114 of the housing 102. As shown, a plurality of sound ports 114 are spaced apart circumferentially in the first housing portion 104. It will be recognized that one or more sound ports may be used. In FIG. 2, the acoustic sealing structure 108 comprises a first layer 115 fastened to a first surface of the armature and a second layer 117 fastened to a second surface, opposite the first surface, of the armature. The one or more sealing structures can be fastened to the armature using glue or other adhesive. In other examples, such as those shown in FIGS. 3, 4, 7, 14, 20 and 21, the acoustic sealing structure 108 is only a single layer that is fastened to a single surface of the armature.

Figure 3:
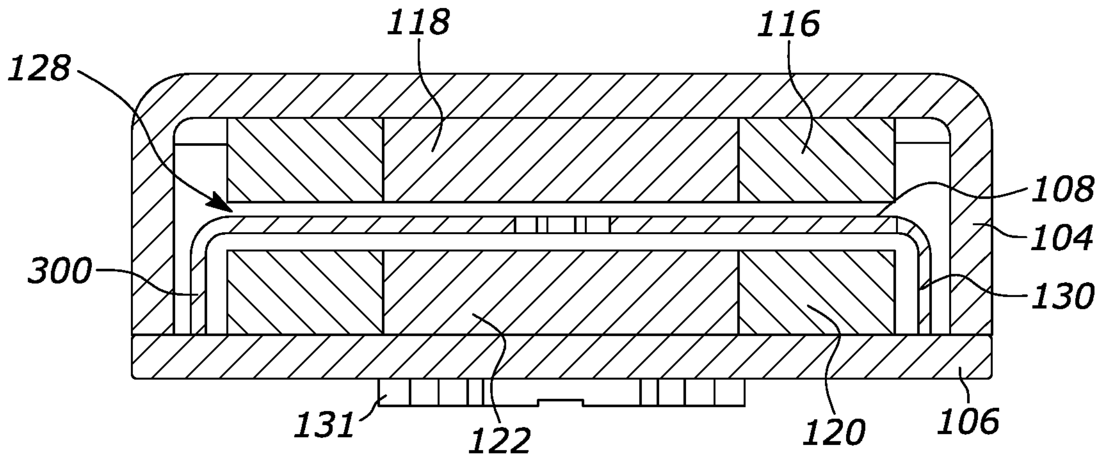
FIG. 3 is a cross section of another example of a loudspeaker having an armature enclosed within a housing cup and housing cover plate in accordance with a representative example disclosed herein.
Figure 4:
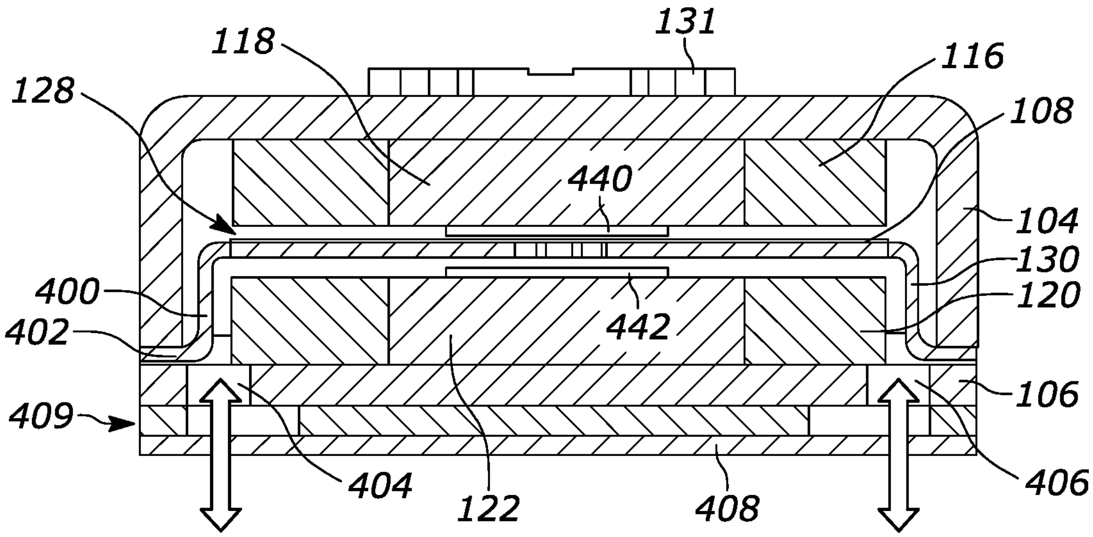
FIG. 4 is a cross section of another example of a loudspeaker having an armature with a horizontal flange that is captured between a housing cup and housing cover plate in accordance with a representative example disclosed herein.

In FIGS. 2-4, a first coil 116 is retained (e.g., using glue or other fastening structure) by the first housing portion 104 in the front volume 110. The first coil 116 comprises a first winding about a corresponding first magnetic core 118 comprising a magnet. A second coil 120 is retained by the second housing portion 106 in the back volume 112. The second coil 120 comprises a second winding about a corresponding second magnetic core 122 comprising a magnet. In FIG. 2, the first magnetic core 122 also includes optionally a flux carrying metal 119. Opposing surfaces 124 and 126 of the first and second magnetic cores 118 and 122 have opposite magnetic polarities and produce a continuous magnetic field in a gap 128 between the first and second magnetic cores 118 and 122. In some implementations, the magnetic cores include pole pieces such as the first and second housing portions. In FIG. 2, the second magnetic core 122 also includes a corresponding flux carrying metal 123. In FIGS. 2-4, a magnetic-flux-carrying armature 130 is movably located in the gap 128 and fastened to the acoustic sealing structure 108. Sound is emitted from the sound port when the armature 130 moves the acoustic sealing structure 108 in the gap. In some examples, the magnetic-flux-carrying armature includes a plurality of movable armature elements as described further herein.

In FIGS. 2-4, the first and second coils 116 and 120 are configured to produce counter-rotating currents in the first and second windings in response to a common excitation signal applied to the first and second coils. Sound is emitted from the one or more sound ports when the armature 130 moves the acoustic sealing structure 108 in response to the common excitation signal. The counter-rotating currents can be generated in the first and second coils wound in the same direction by applying the common excitation signal to opposite polarity terminals of the coils. The counter-rotating currents can be generated in the first and second coils wound in opposite directions by applying the common excitation signal to the same polarity terminals of the coils. The coils can be connected in parallel or in series via a common terminal 131.

Figure 13:
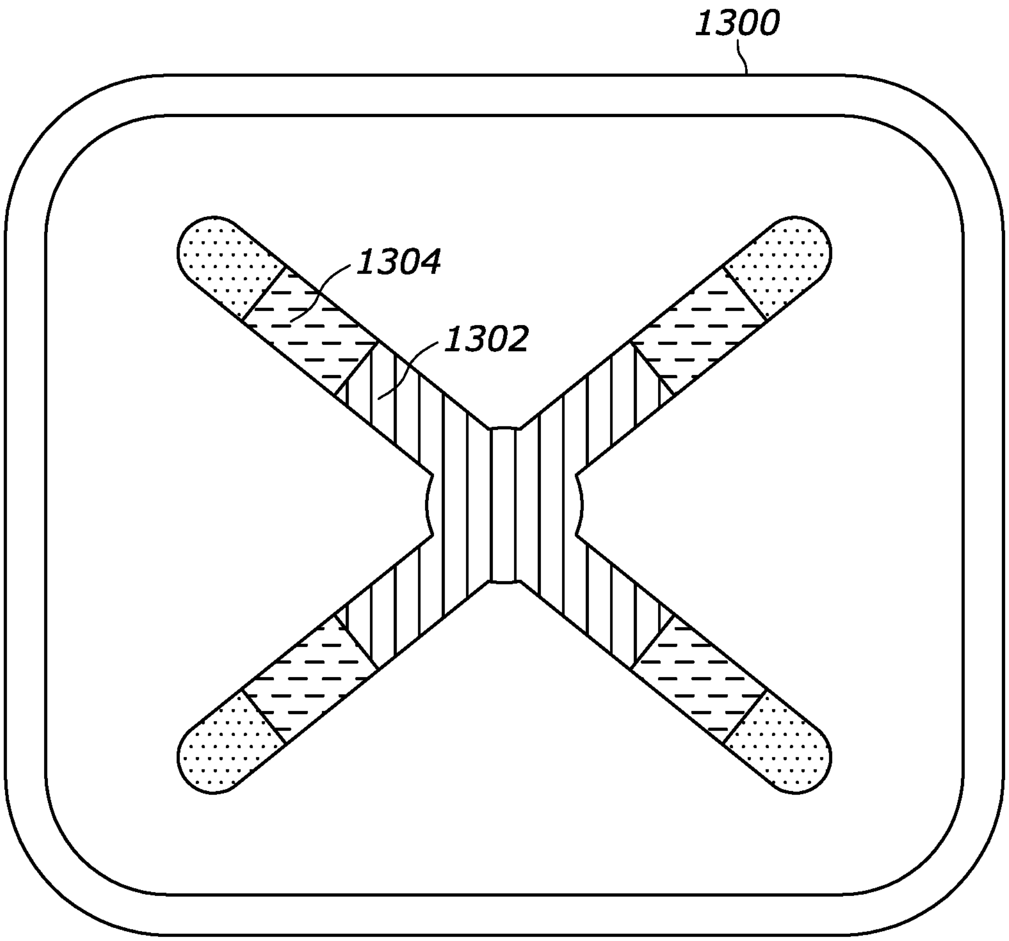
FIG. 13 illustrates a top view of a portion of a loudspeaker in a non-circular housing in accordance with a representative example disclosed herein.

In FIGS. 1 and 2, the loudspeaker housing 102 has a circular cross section and is cylindrical. The first magnetic core 118 is cylindrical and the corresponding coil 116 is cylindrical. Likewise, the second magnetic core 122 is cylindrical and the corresponding coil 120 is cylindrical. Similarly, the armature 130 is cylindrical and includes a peripheral ring portion that is sandwiched between the first and second housing portions. The acoustic sealing structure 108 is also circular in this example. FIG. 13 illustrates a rectangular shaped housing 1300 with rectangular or cylindrical magnetic cores 1302 and corresponding rectangular or cylindrical coils 1304 as well as a rectangular armature and acoustic sealing structure. However, other shaped housings, magnetic cores and coils may be used alternatively. The loudspeakers disclosed herein have a relatively low physical profile characterized by a width to height ratio between 2 and 15, wherein the height is a measure along an axial dimension though the magnetic cores between the top and bottom surfaces of the housing and the width is a measure of the housing transverse to the axial dimension. Thus these loudspeakers are suitable for use in ear-worn hearing devices and in other space-constrained applications.

Also, various configurations of the housing portions and armature may be employed. For example, in FIGS. 1, 2, 5 and 6 each of the first housing portion 104 and the second housing portion 106 are configured as cups each having a base and sidewalls whereas in FIGS. 3, 4, 7, 14, 20 and 21, the first housing portion 104 is configured as a cup and the second housing portion 106 is configured as a substantially planar cover plate. In some examples, a peripheral portion of the armature is captured between the first housing portion and the second housing portion. As illustrated in FIGS. 1, 2, 5 and 6 the housing comprises a first cup portion retaining the first coil and a second cup portion retaining the second coil, the armature 130 is a substantially planar member, and a portion 140 of the peripheral portion of the armature 142 is captured between the first cup portion and the second cup portion. The armature can be retained by a glue or fastening structure.

Figure 5:
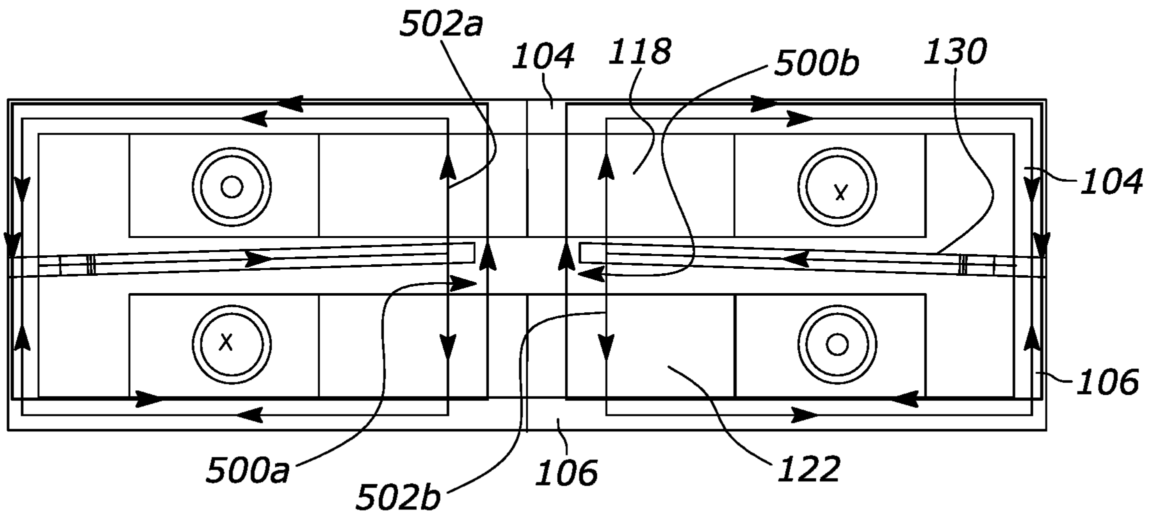
FIG. 5 is a diagram illustrating an example of a magnetic circuit configuration moving armature elements of an armature in an upward direction, in accordance with a representative example disclosed herein.
Figure 6:
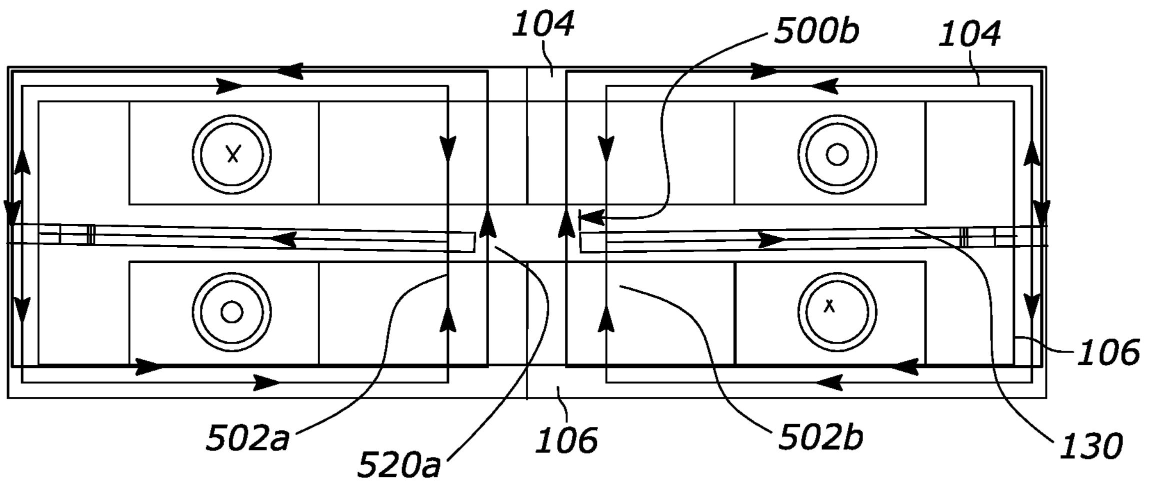
FIG. 6 is a diagram illustrating an example of a magnetic circuit configuration moving armature elements of an armature in a downward direction, in accordance with a representative example disclosed herein.

In other examples illustrated in FIGS. 4, 7, 14, 20 and 21, a cup portion retains the first coil 116 and the second housing portion is a plate portion retaining the second coil 120. The peripheral portion of the armature 130 comprises a contoured portion 400 having a flange 402 captured between the cup portion and the plate portion. However, the peripheral portion can be in a common plane with the armature elements as shown in FIGS. 2, 5, 6, 8, 9 and 11. In FIGS. 2, 5 and 6, the peripheral portion of the armature is captured between first and second cup portions 104, 106 of the housing. In FIG. 3, the peripheral portion of the armature is fastened to the housing portion 106.

In FIG. 4, the loudspeaker includes vents 404 and 406 in the cover plate to vent air from the portion of the housing defining the back volume to ambient. In FIG. 4, the back volume is located on a bottom side of the diaphragm and the front volume coupled to one or more acoustic ports (shown in FIG. 1) is on the top side of the diaphragm. In other implementations, the front volume can be on the bottom side of the diaphragm and back volume can be on the top side, depending on the location of the sound port. FIG. 4 also includes an acoustic damping material 408, such as a ring damper, affixed to a bottom surface of the cover plate with a layer of pressure sensitive adhesive 409 or other adhesion element. The acoustic damping material 408 is disposed over the back volume vents 404 and 406 to dampen acoustic peaks. In some implementation, an acoustic damping material can be disposed over the one or more sound ports.

Figure 20:
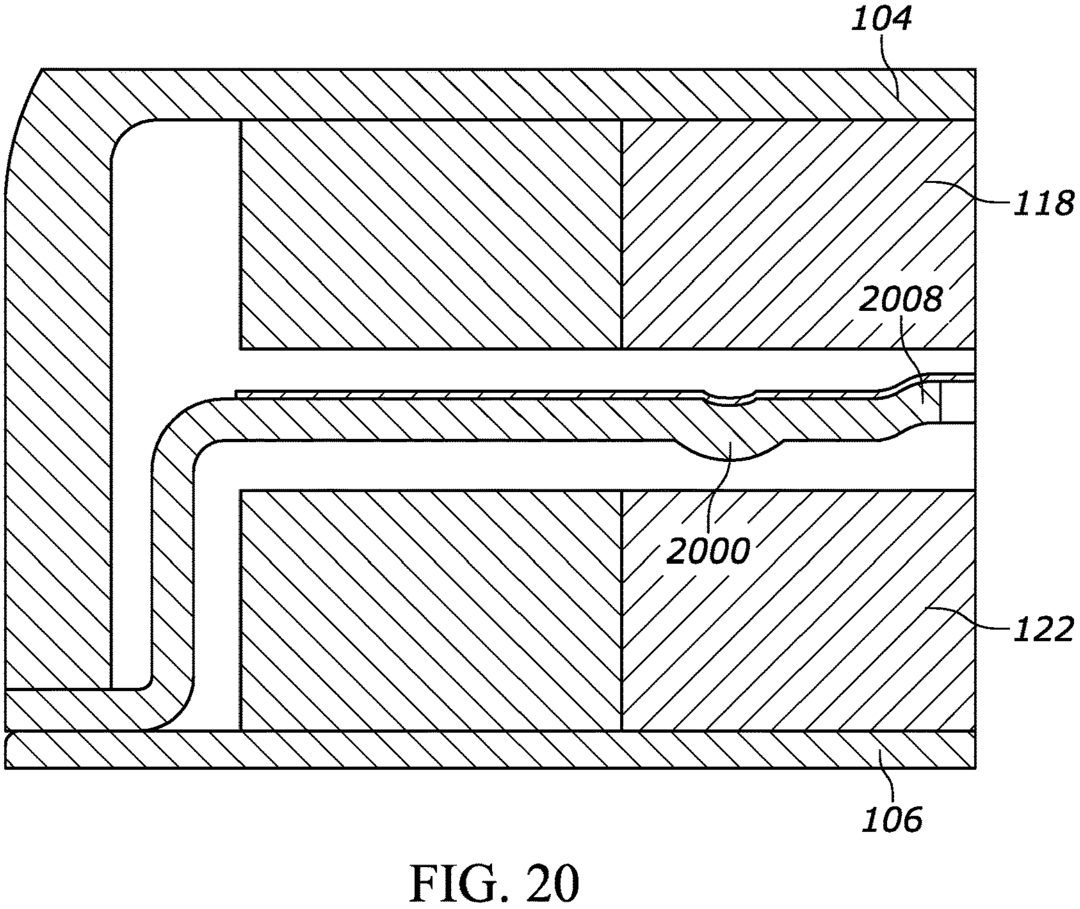
FIG. 20 illustrates an armature that includes a plurality of a deflection limiting members in accordance with a representative example set forth herein.
Figure 21:
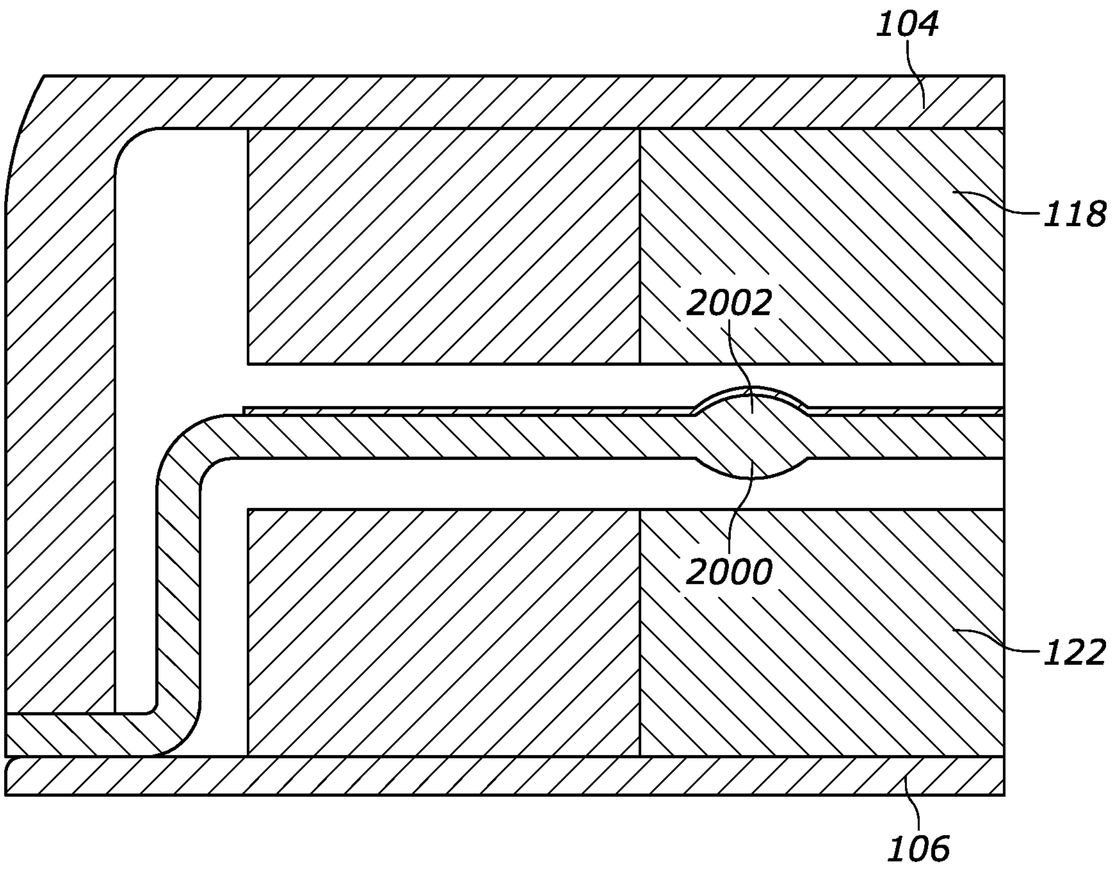
FIG. 21 illustrates another example of an armature that includes a plurality of deflection limiting members in accordance with a representative example set forth herein.

In some implementations, the loudspeaker comprises structure to limit over-deflection of the armature. In FIG. 4, non-magnetic shims 410, 412, such as a plastic or aluminum shim, are disposed on each of the opposing surfaces of the first and second magnetic cores. The non-magnetic shims limit over-deflection of the armature. In FIGS. 20 and 21, over-deflection protrusions 2000, 2002 are placed on the armature elements. Also in FIG. 4, the terminal 131 is located on an outer surface of the first housing cover 104. Alternatively, protrusions can be located on opposite surfaces of the armature to limit over-deflection. Such protrusions can be integrally formed in a stamping operation or by fastening bumpers or other material to the armature. In FIG. 20, protrusion 2000 limits over-deflection in one direction and protrusion 2008 limits over-deflection in the opposite direction. Protrusion 2000 is radially offset relative to protrusion 2008 and can be formed in a stamping operation. In FIG. 21, protrusions 2000 and 2002 are formed on opposite sides of the armature and can be form by fastening bumpers on the armature.

Figure 15:
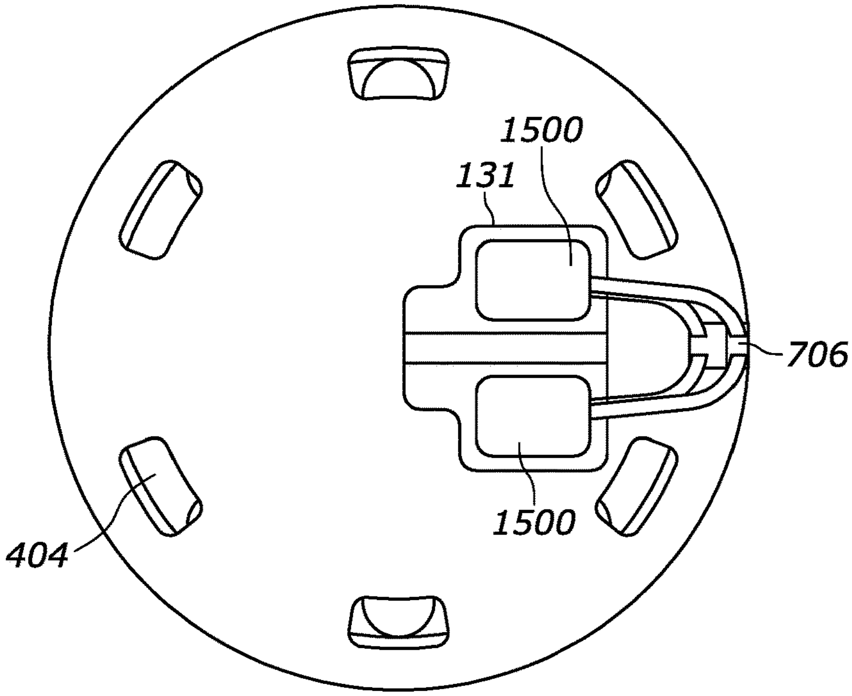
FIG. 15 is a bottom view of the loudspeaker of FIG. 1 illustrating a parallel connection such that a positive of a first coil and a negative of a second coil are connected to drive in opposite directions.

Referring to FIGS. 5 and 6, in operation, an electrical coil drive circuit provides a common excitation signal to both coils to move armature in the gap between the magnetic cores that cause the acoustic seal (not shown for convenience) to move. In FIG. 15, electrical contacts 1500 of the terminal 131 are accessible from an exterior of the housing. In FIGS. 5 and 6, the magnetic cores 118 and 122 produce a continuous flux shown by arrows 500*a* and 500*b*. The coil current direction is shown by the "0" and "X" in the coils. The alternating current (AC) flux is shown by arrows 502*a* and 502*b* to change directions depending on the polarity of the excitation signal to move the armature elements up as shown in FIG. 5 or down as shown in FIG. 6. The first and second windings are configured to produce counter-rotating currents in response to the common excitation signal.

Figure 7:
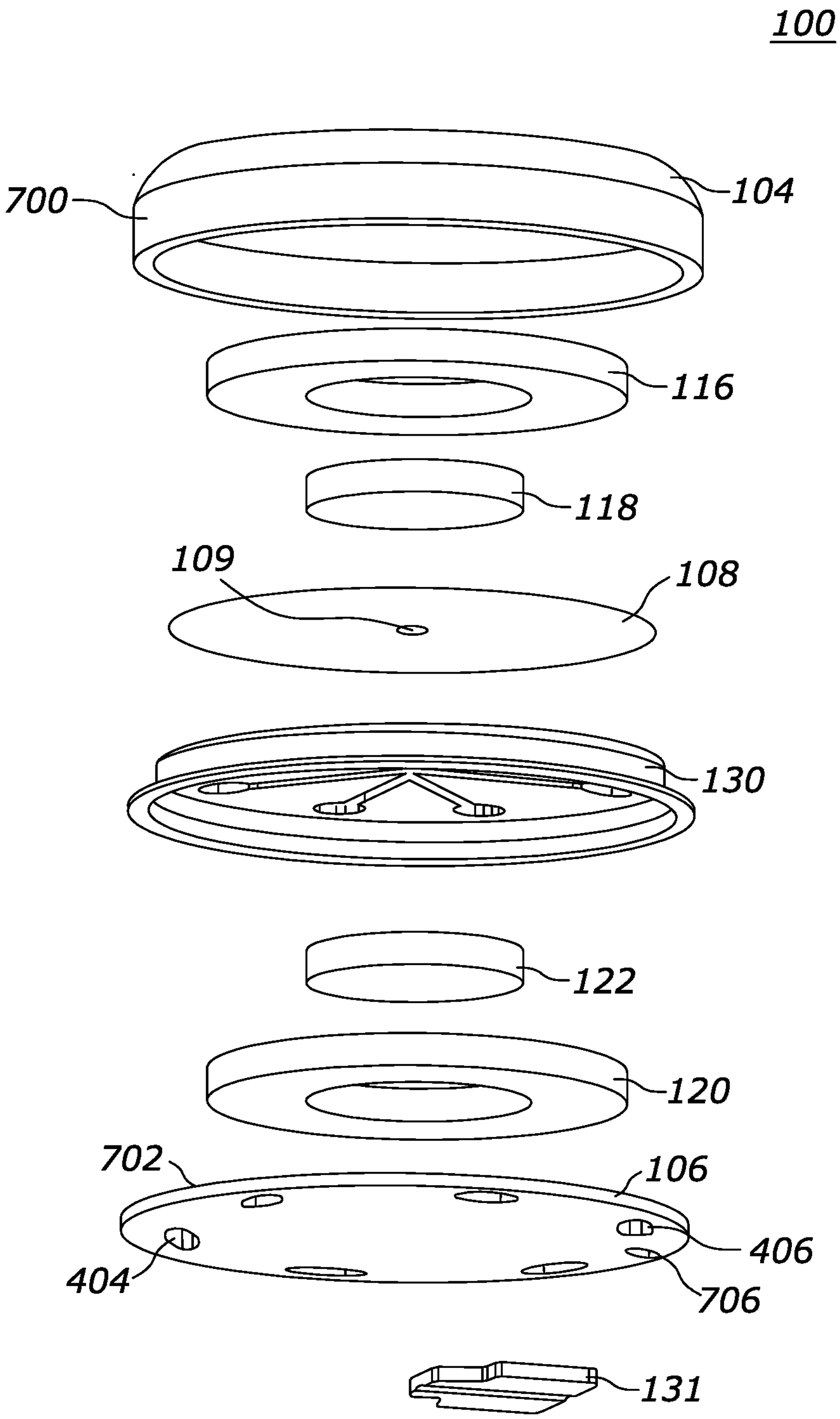
FIG. 7 illustrates an exploded assembly view of a loudspeaker shown in FIG. 4 in accordance with a representative example disclosed herein.

FIG. 7 illustrates an exploded assembly view of a representative loudspeaker that employs a housing cup 700 and housing plate 702 configured with an armature 130 of type shown in FIGS. 4, 10, 16, 16-18, 20 and 21 or otherwise contemplated herein. The housing and armature are magnetic flux carrying metals comprising a low coercivity, low core loss, low distortion and high magnetic permeability. Such metals can be iron-nickel alloys. The diaphragm comprising the sealing structure and the armature can include a pierce 109 that provides barometric pressure relief between the back and front volumes. The pierce also functions as an acoustic filter that attenuates low frequencies of the loudspeaker, wherein the filter corner frequency depends on the size of the pierce. The pierce can be sized to filter low frequency noise. In some implementations, the housing and armature are made of iron-nickel alloys. Also by way of example, the cup/plate/armature to cup/plate/armature can be glued or welded. The magnets to cup/plate can be glued or welded. The coils to magnet/cup/plate can be glued. In some implementations the overall height is about 2 mm.

In this example, the loudspeaker 100 is cylindrical. As such, the housing 102 has a cylindrical shape, the coils 116 and 120 are wound in a circular configuration, the magnetic cores 118 and 122 are cylindrical, the acoustic sealing structure 108 is cylindrical, the armature 130 is cylindrical and the cover plate 702 is cylindrical. However, the loudspeaker can also assume other suitable shapes. In this example, the cover plate 702 includes a plurality of vents 404, 406 and a coil wire opening 706 that receives the coil wires from the two coils for connection to the terminal 131.

As noted above, the armature 130 can have various configurations. For example, the armature shown in FIGS. 2, 5, 6 8, 9 and 11 is configured as a substantially planar member. In FIGS. 4, 7, 10, 14-18, 20 and 21, the peripheral portion of the armature 130 comprises a contoured portion having a flange captured between the cup portion and the plate portion. In yet another example shown in FIG. 3, the peripheral portion of the armature has a contoured portion 300 without a flange and is secured to a top surface of the plate 106 instead of having a peripheral portion, such as the flange, captured between the first housing portion and the second housing portion. Also, for example, one or more of a plurality of armature elements are configured with a different geometry, different mass, or different flexibility than other armature elements, and the differently configured armature elements each have a corresponding resonant frequency.

Figure 8:
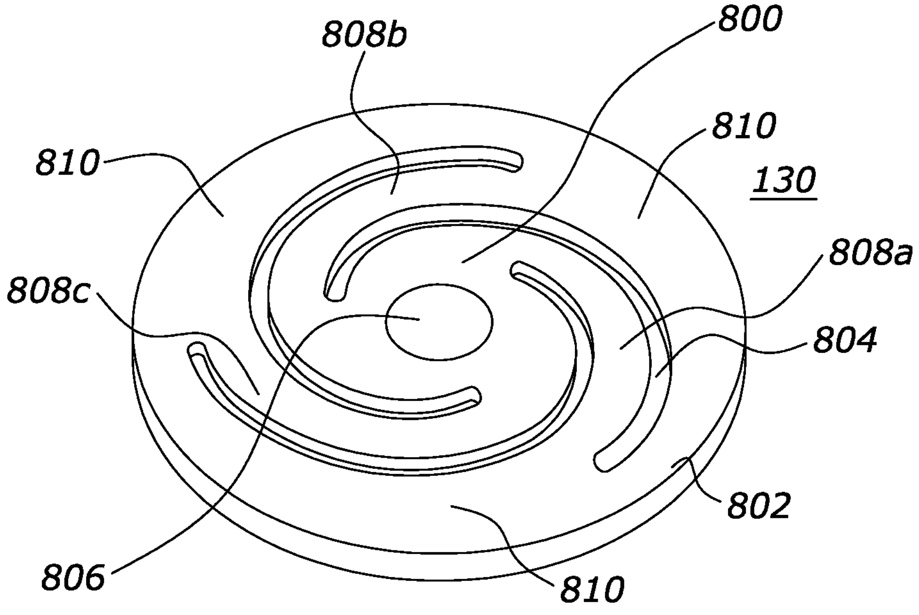
FIG. 8 illustrates an armature configuration in accordance with a representative example disclosed herein.
Figure 9:
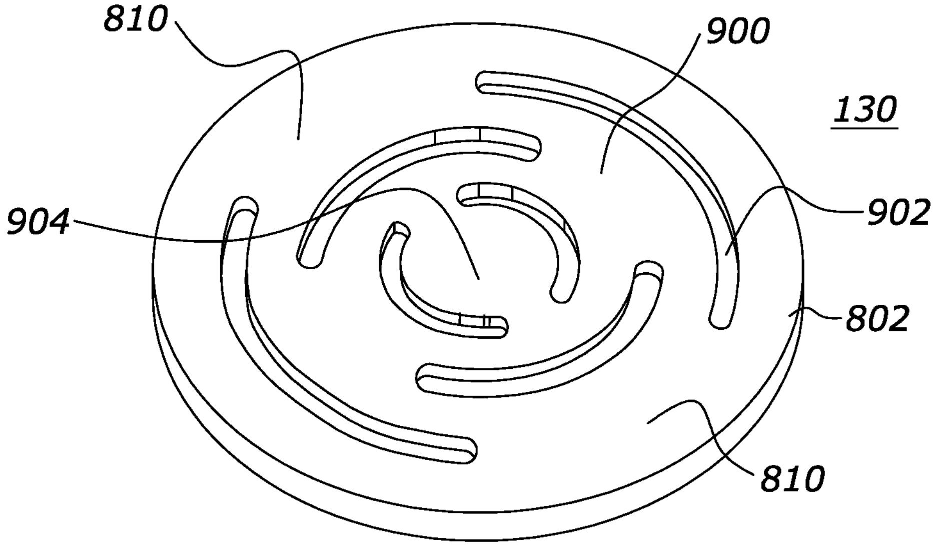
FIG. 9 illustrates an armature configuration in accordance with a representative example disclosed herein.

In FIGS. 8 and 9, the armature 130 comprises integrated spring element 800 and 900, respectively, flexibly coupled to a peripheral portion 802 of the armature. The armature and the acoustic sealing structure 108 are movable in the gap between the first and second magnetic cores in response to the common excitation signal. In these examples, slots 804 and 902 form a spring structure. In these examples, the armature is formed from a circular plate generally comprising a center portion connected to the peripheral portion by spring members. In FIG. 8, variable radial slots (e.g., spiral slots) form curved armature fingers 808*a*-808*c* that have respective hinge portions 810 adjacent to the peripheral portion 802. Ends of each curved finger 808*a*-808*c* are attached to each other at the center portion 806. FIG. 9 illustrates another spring configuration wherein partial annular slots form fingers that each have hinge portions 810.

Figure 10:
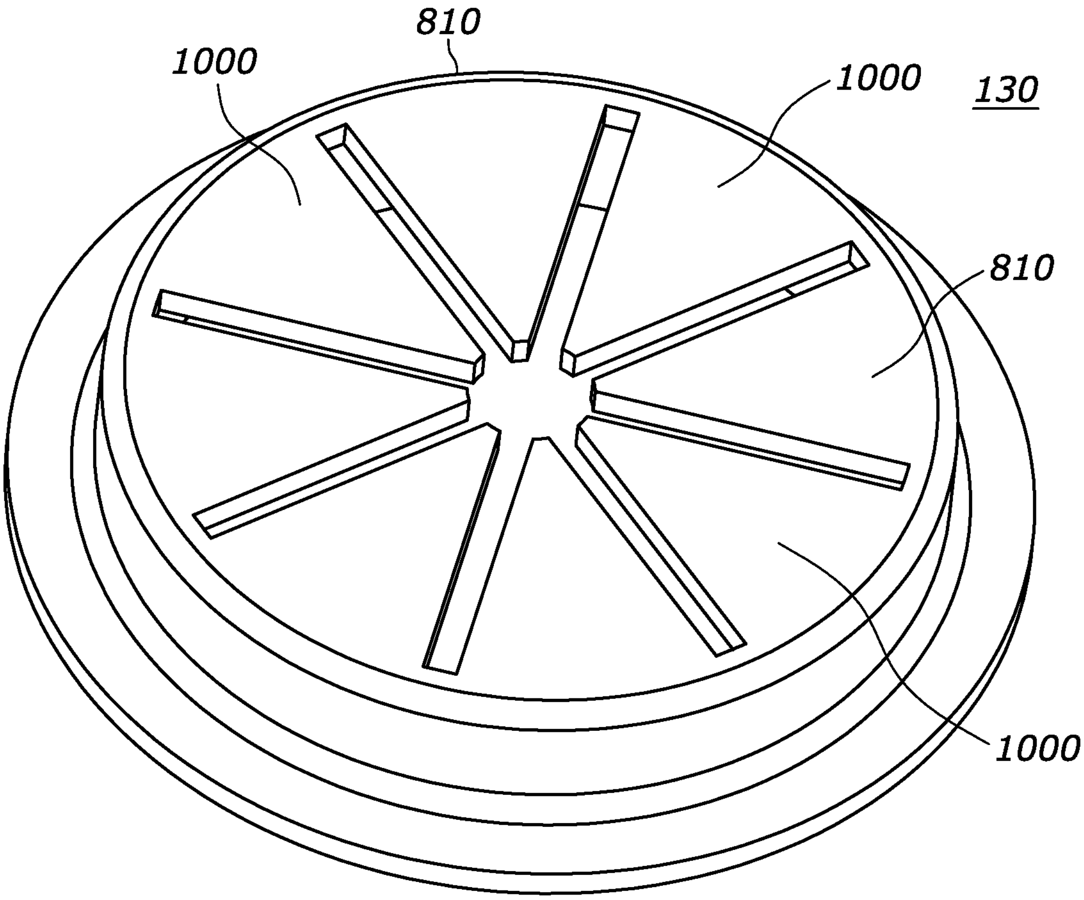
FIG. 10 illustrates an armature configuration in accordance with a representative example disclosed herein.
Figure 11:
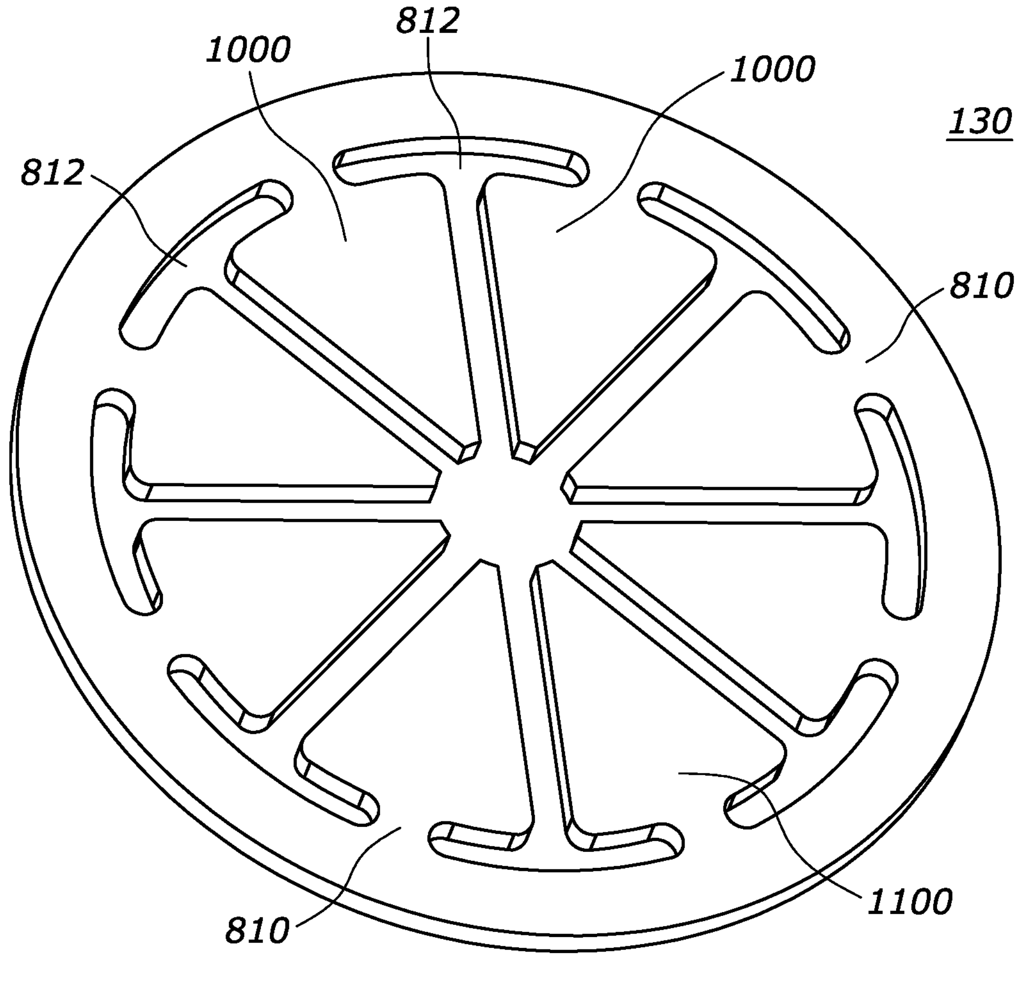
FIG. 11 illustrates an armature configuration in accordance with a representative example disclosed herein.
Figure 12:
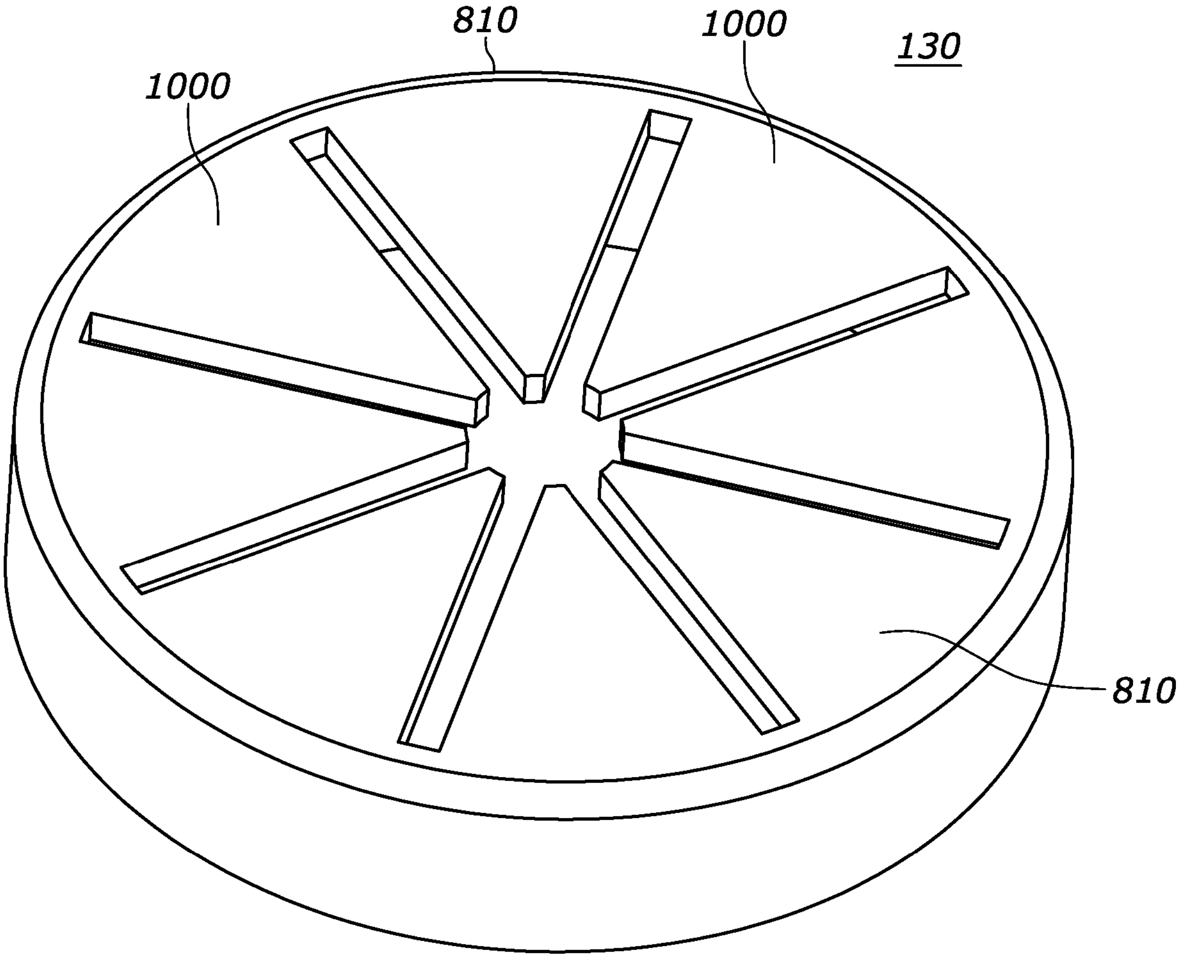
FIG. 12 illustrates an armature configuration in accordance with a representative example disclosed herein.
Figure 14:
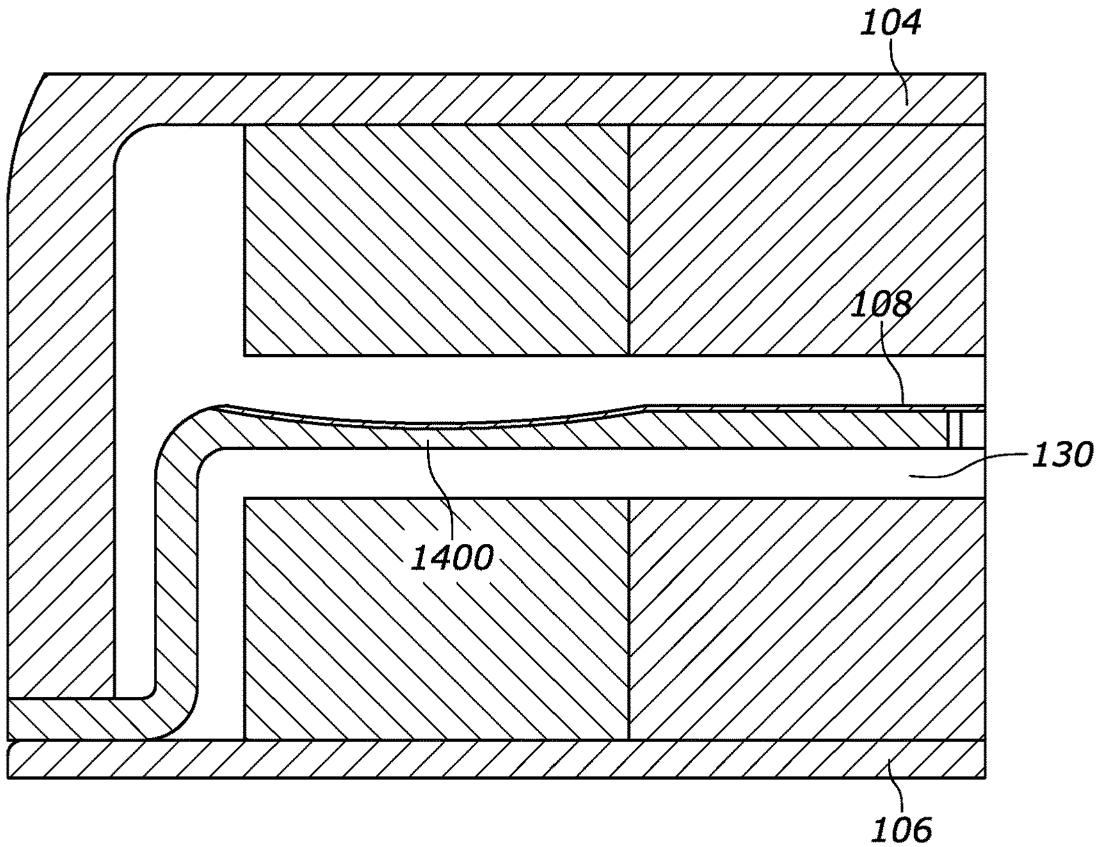
FIG. 14 illustrates an armature element having a thinned hinge portion in accordance with a representative example disclosed herein.

In FIGS. 10, 11 and 12, linear radial slots and an open center aperture define symmetric armature elements 1000 flexibly coupled to a peripheral portion of the armature by corresponding hinges 810. In FIGS. 10 and 12, the hinge comprises material connecting the armature element to the outer peripheral portion of the armature. In FIG. 11, the hinge portions 810 are partly defined by slots 812, the size of which can be selected to increase or decrease hinge stiffness. The stiffness of the hinges can also be reduced by reducing the material thickness near the peripheral portion of the armature. The resonance of the armature and thus the frequency response of the loudspeaker can depend on the stiffness of the hinges. FIG. 14 illustrates a hinge portion 1400 having reduced thickness relative to the thickness of the armature element. The material thickness can be reduced in a coining operation, milling or other process to increase flexibility. In some implementations, all of the armature elements have a common hinge stiffness and in other embodiments the armature elements can have a different stiffness. However, it will be recognized that the configuration, size and stiffness of the armature elements can be different to provide desired armature resonance characteristics as described herein.

Figure 16:
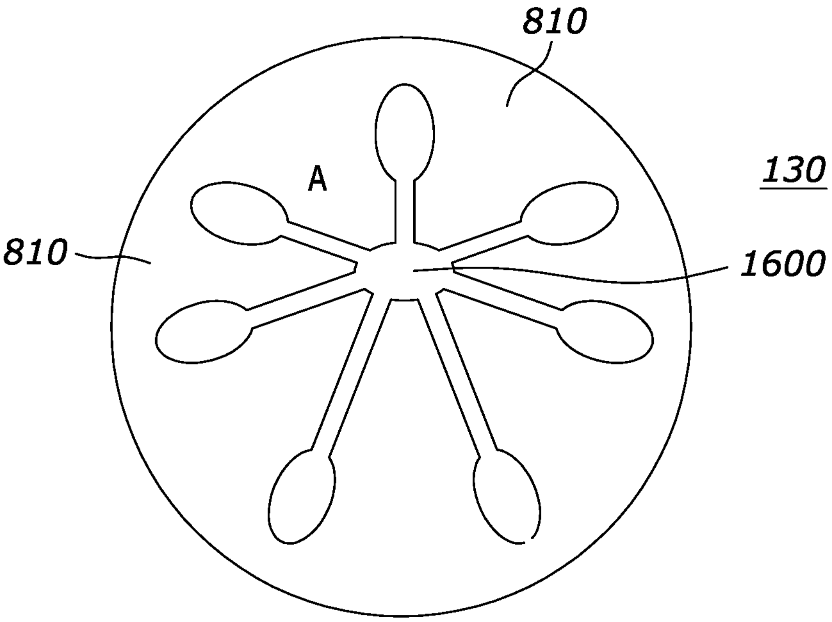
FIGS. 16-18 illustrate examples of an armature configurations where different armature elements are labelled in connection with the acoustic response graph of FIG. 19.
Figure 17:
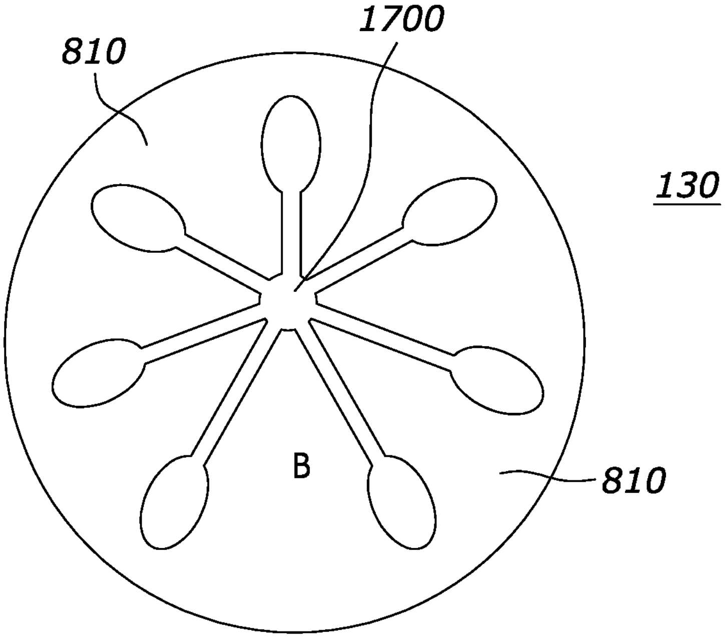
Figure 18:
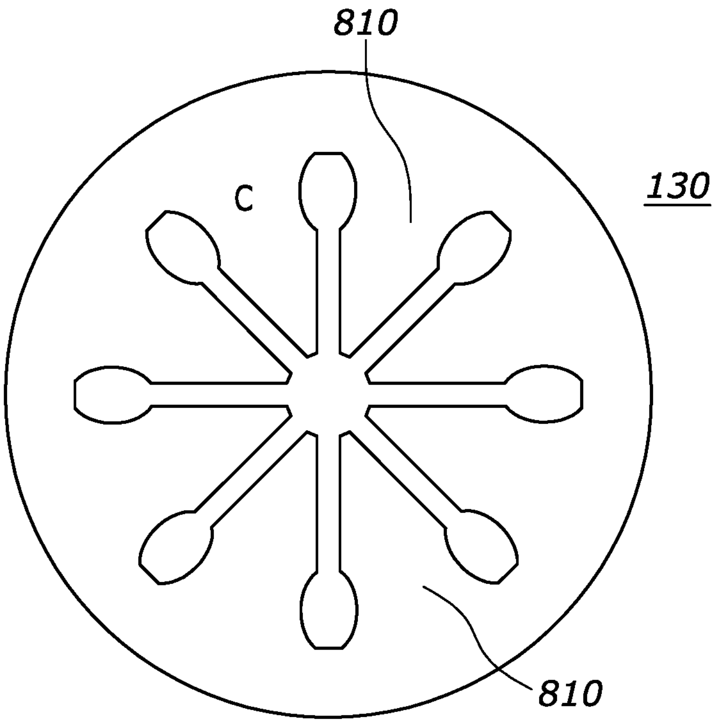

FIGS. 16, 17 and 18 illustrate the plurality of multiple armature elements in asymmetric configurations within the peripheral portion of the armature 130. In these examples, an open center portion 1600 is offset in varying degrees relative to the geometric center of the armature. The resulting armature elements have different sizes, shapes and locations within the armature. Each unique armature element has a characteristic resonance, the sum total of which provide the loudspeaker with a unique frequency response.

Figure 19:
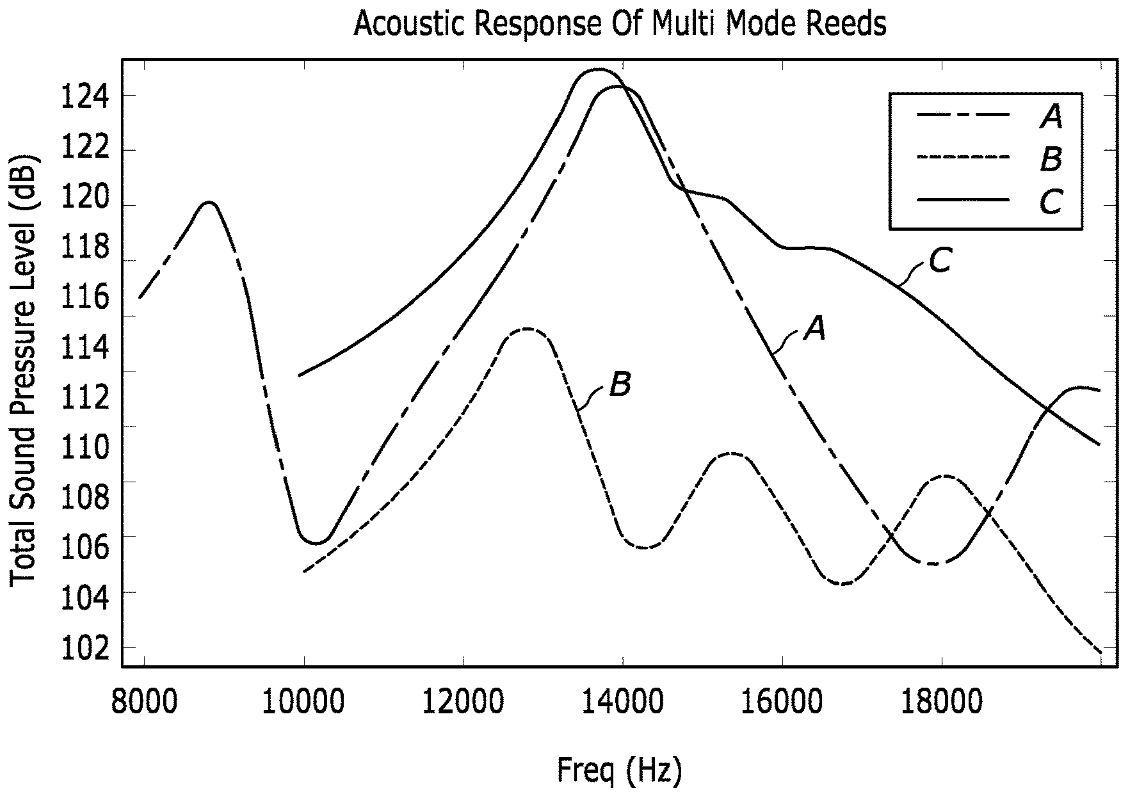
FIG. 19 illustrates an example of an acoustic response graph of the labelled armature elements shown in FIGS. 16-18.

In FIG. 19, a graph illustrates the unique acoustic frequency response of each of the unique armatures in FIGS. 16-18. Graph "A" represents the acoustic frequency response of the asymmetric armature elements in FIG. 16. Graph "B" represents the acoustic frequency response of the asymmetric armature elements in FIG. 17. Graph "C" represents the acoustic frequency response of the symmetric armature elements in FIG. 18. As shown, the asymmetric armature elements of FIG. 16 produce a higher acoustic response at lower frequencies (e.g., approximately 9,000 Hz and 20,000 Hz) than the symmetric armature elements in FIG. 18. Graph "B" in FIG. 19 shows that the loudspeakers disclosed herein can be configured to produce multiple and comparatively uniform resonance peaks across a relatively large portion of the audio frequency spectrum by appropriate configuration of the armature elements. Prior art speakers and receivers are generally capable of producing only one or two relatively sharp resonance peaks over a comparatively small portion of the spectrum, complicating electronic equalization. Thus those of ordinary skill in the art will recognize that the acoustic frequency response of the loudspeakers disclosed herein can be customized by configuring the armature and particularly the characteristics of the armature elements.

In comparison to balanced armature receivers, the loudspeakers disclosed herein have fewer parts, are less complex, less laborious to assemble, smaller size, and are generally less costly. For example, the loudspeakers disclosed herein do not include a drive rod or an internal yoke and do not require that the coil be assembled around the armature. In implementations with circular motors or cylindrical housings, the device can be more compatible to be combined with dynamic drivers for hybrid earphone applications. In some implementations, a simpler build process can be affected compared to conventional BA receivers. In some implementations, adjustable frequency response peaks can be provided by changing the multiple armature elements of the armature geometry.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A hearing-device loudspeaker comprising:

a magnetic-flux-carrying housing;

an acoustic sealing structure separating an interior of the housing into a back volume and a front volume connected to a sound port of the housing;

a first coil disposed in the front volume, the first coil having a first winding about a corresponding first magnetic core;

a second coil disposed in the back volume, the second coil having a second winding about a corresponding second magnetic core, opposing surfaces of the first and second magnetic cores having opposite magnetic polarities and generating a magnetic field in a gap between the first and second magnetic cores, and the first and second coils configured to produce counter-rotating currents in the first and second windings in response to a common excitation signal applied to the first and second coils; and a magnetic-flux-carrying armature fastened to the acoustic sealing structure and movably located in the gap, wherein sound is emitted from the sound port when the armature moves the acoustic sealing structure in response to the common excitation signal.

2. The loudspeaker of claim 1, the armature comprises a single armature element flexibly coupled to a peripheral portion of the armature, wherein the single armature element and the acoustic sealing structure are movable in the gap in response to the common excitation signal.

3. The loudspeaker of claim 1 wherein the armature comprises a plurality of multiple armature elements coupled to a peripheral portion of the armature by a corresponding hinge, wherein the plurality of armature elements and the acoustic sealing structure are movable in the gap in response to the common excitation signal.

4. The loudspeaker of claim 3 wherein at least some of the plurality of armature elements are asymmetrically configured within the peripheral portion of the armature.

5. The loudspeaker of claim 3 wherein one or more of the plurality of armature elements are configured with a different geometry, different mass, or different flexibility than other armature elements, wherein the differently configured armature elements each have a corresponding resonant frequency.

6. The loudspeaker of claim 1 wherein the housing comprises a cup portion retaining the first coil and a plate portion retaining the second coil, and a peripheral portion of the armature comprises a contoured portion having a flange captured between the cup portion and the plate portion.

7. The loudspeaker of claim 1 wherein the housing comprises a first cup portion retaining the first coil and a second cup portion retaining the second coil, the armature is a substantially planar member, and a portion of a peripheral portion of the armature is captured between the first cup portion and the second cup portion.

8. The loudspeaker of claim 1 further comprising a protrusion on opposite surfaces of each of a plurality of armature elements, wherein the protrusions limit over-deflection of the plurality of armature elements.

9. The loudspeaker of claim 8 further comprising a non-magnetic shim disposed on each of the opposing surfaces of the first and second magnetic cores, wherein the non-magnetic shims limit over-deflection of the plurality of armature elements.

10. The loudspeaker of claim 1 further comprising an acoustic damping material disposed over a vent through a portion of the housing defining the back volume.

11. The loudspeaker of claim 1 wherein the acoustic sealing structure comprises a first layer fastened to a first surface of the armature and a second layer fastened to a second surface, opposite the first surface, of the armature.

12. A wearable loudspeaker comprising:

a magnetic-flux-carrying housing comprising a first housing portion and a second housing portion;

an acoustic sealing structure separating an interior of the housing into a front volume and a back volume, the front volume coupled to a sound port of the housing;

a first coil retained by the first housing portion in the front volume, the first coil comprising a first winding about a corresponding first magnetic core;

a second coil retained by the second housing portion in the back volume, the second coil comprising a second winding about a corresponding second magnetic core, opposing surfaces of the first and second magnetic cores having opposite magnetic polarities and producing a magnetic field in a gap between the first and second magnetic cores, a magnetic-flux-carrying armature movably located in the gap and fastened to the acoustic sealing structure, wherein sound is emitted from the sound port when the armature moves the acoustic sealing structure in the gap.

13. The loudspeaker of claim 12, the armature comprises a single armature element flexibly coupled to a peripheral portion of the armature, wherein the single armature element and the acoustic sealing structure are movable in the gap.

14. The loudspeaker of claim 13 further comprising a deflection limiting member located between opposite surfaces of the armature element and the opposing surfaces of the first and second magnetic cores.

15. The loudspeaker of claim 12 wherein the armature comprises a plurality of armature elements coupled to a peripheral portion of the armature by a corresponding hinge, wherein the plurality of armature elements and the acoustic sealing structure are movable in the gap.

16. The loudspeaker of claim 15 wherein at least some of the plurality of armature elements are asymmetrically configured within the peripheral portion of the armature.

17. The loudspeaker of claim 15 wherein one or more of the plurality of armature elements are configured with a different geometry, different mass, or different flexibility than other armature elements, wherein the differently configured armature elements contribute to a frequency response of the loudspeaker.

18. The loudspeaker of claim 12 further comprising electrical contacts accessible from an exterior of the housing, wherein the first and second windings are connected in parallel and configured to produce counter-rotating currents in response to a common excitation signal applied to the electrical contacts.

19. The loudspeaker of claim 12 further comprising electrical contacts accessible from an exterior of the housing, wherein the first and second windings are connected in series and configured to produce counter-rotating currents in response to a common excitation signal applied to the electrical contacts.

20. The loudspeaker of claim 12, a peripheral portion of the armature captured between the first housing portion and the second housing portion.

* * * * *